Oct. 5, 1965  B. A. SCHILTZ  3,209,932
HAYSTACK MOVING APPARATUS
Filed Oct. 22, 1963  4 Sheets-Sheet 1
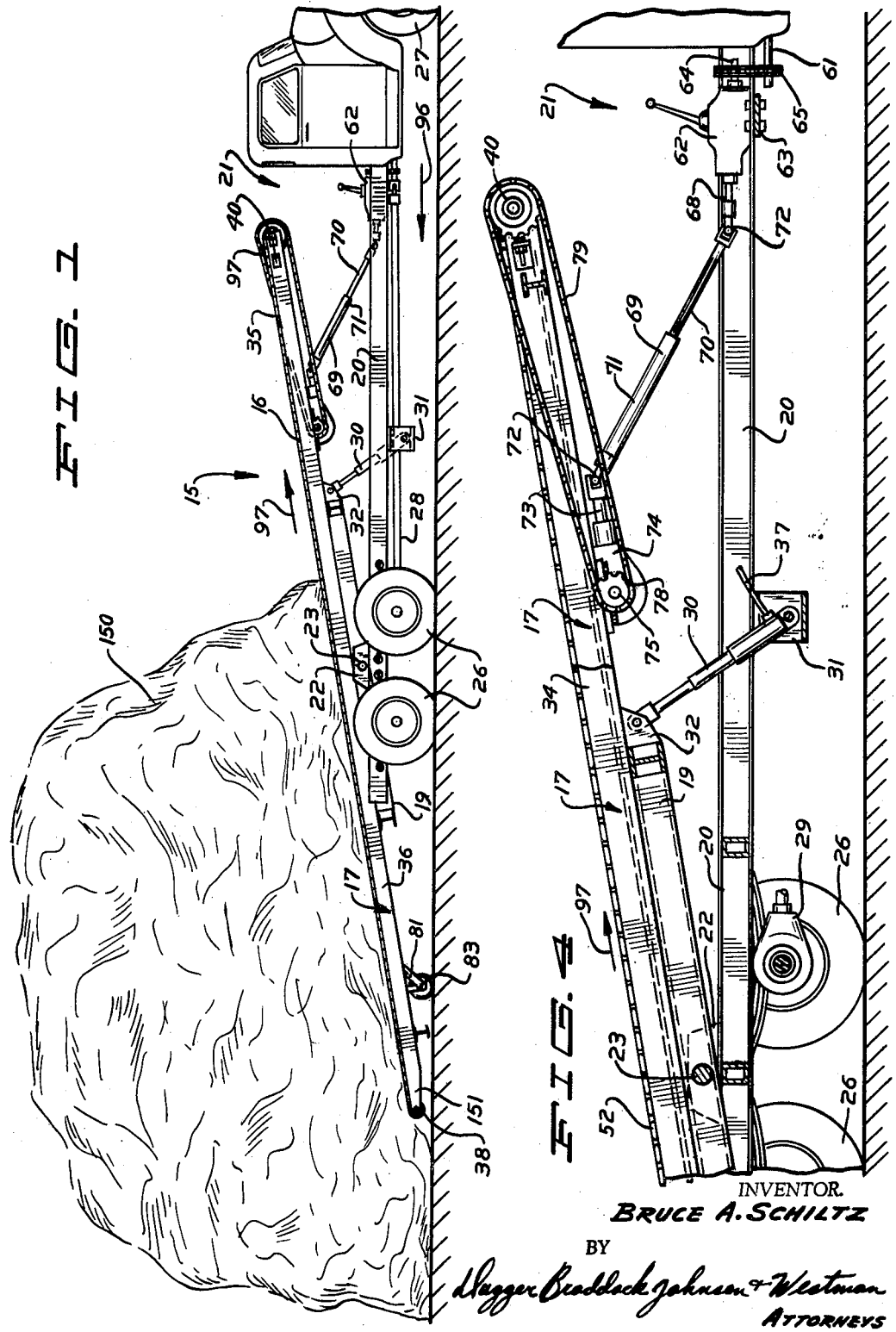
INVENTOR.
BRUCE A. SCHILTZ
BY
Dugger, Braddock, Johnson & Westman
ATTORNEYS Oct. 5, 1965     B. A. SCHILTZ     3,209,932
HAYSTACK MOVING APPARATUS
Filed Oct. 22, 1963     4 Sheets-Sheet 2
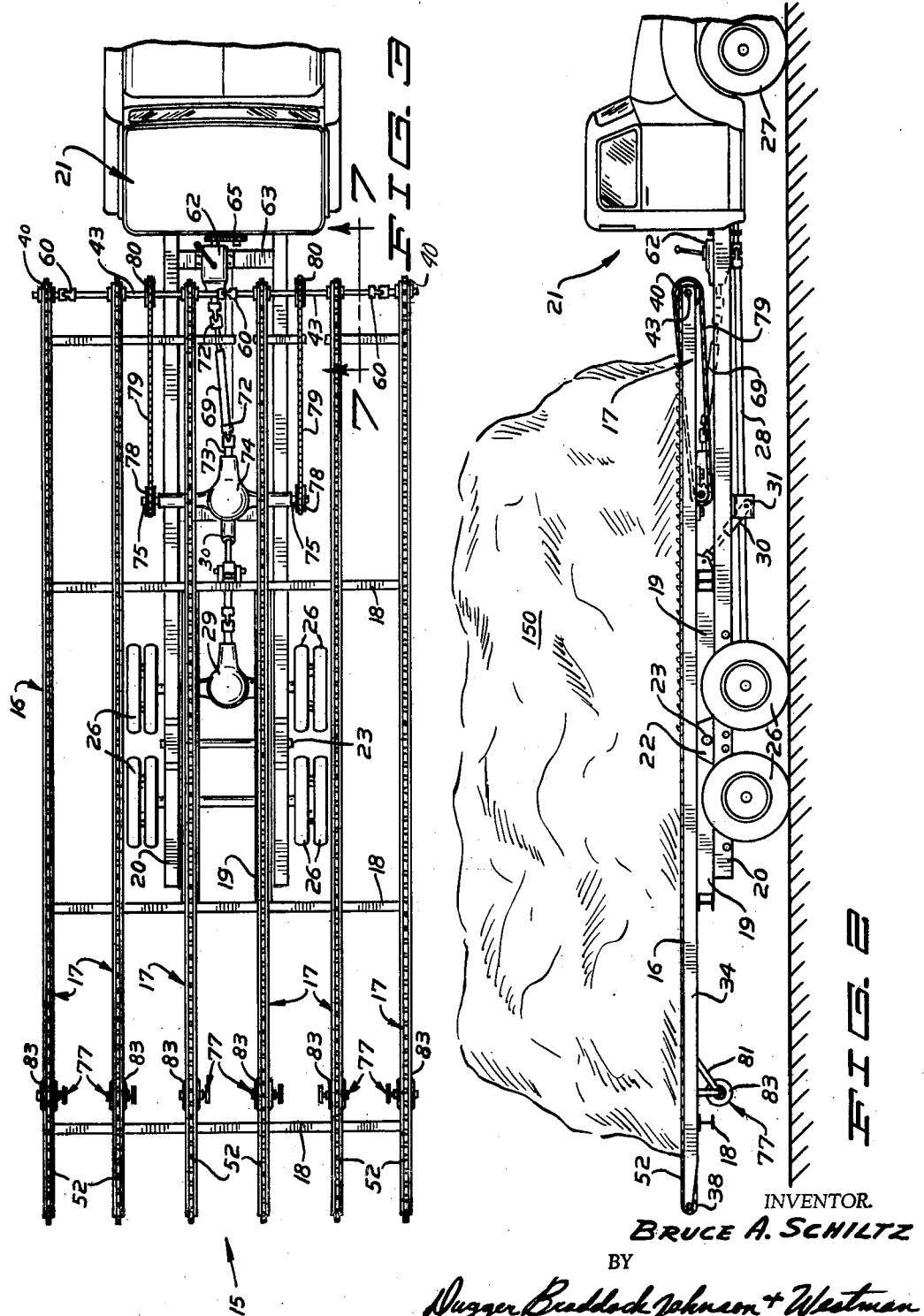
INVENTOR.
BRUCE A. SCHILTZ
BY
*Dugger Braddock Johnson + Westman*
ATTORNEY

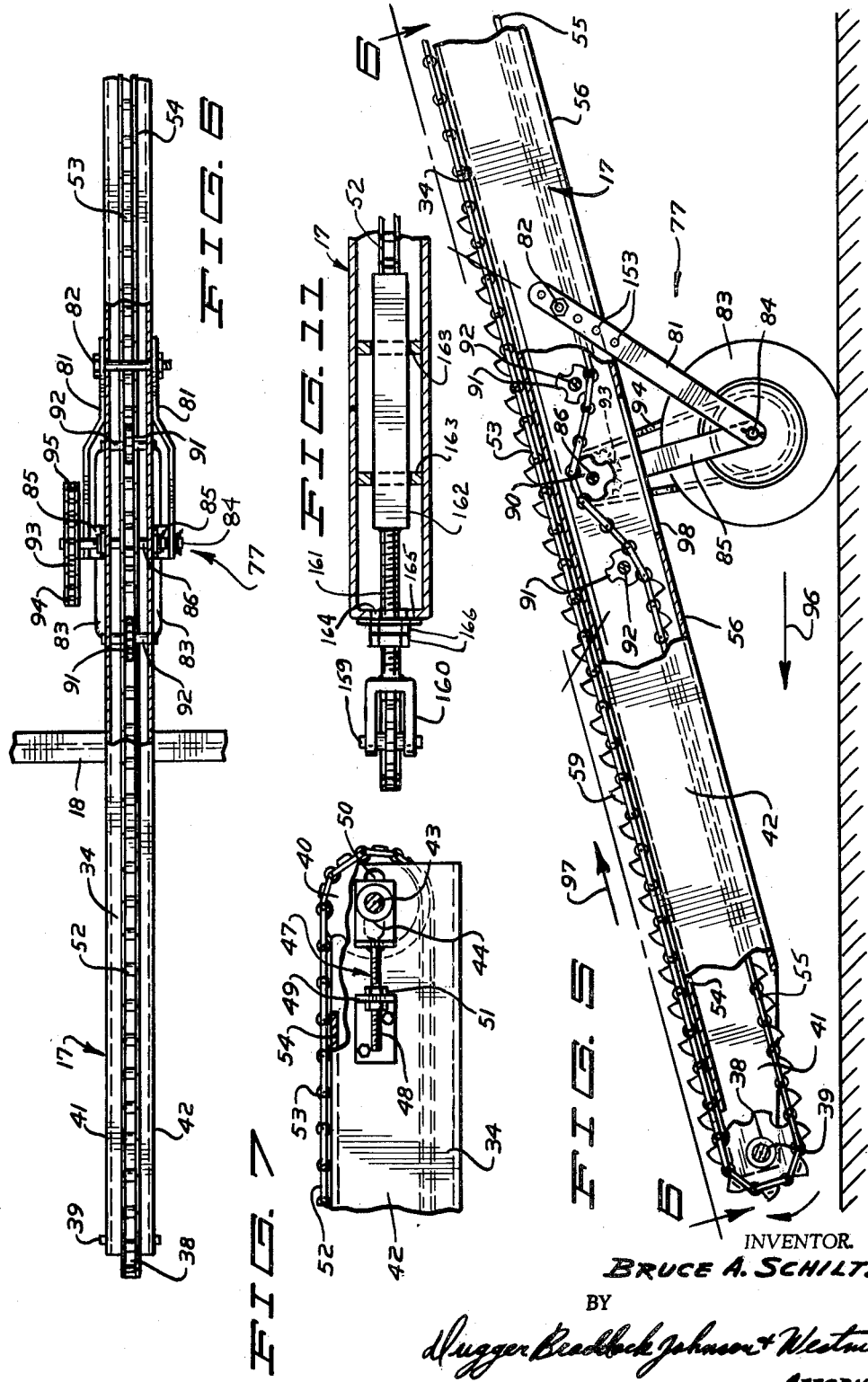

Oct. 5, 1965

B. A. SCHILTZ 3,209,932

HAYSTACK MOVING APPARATUS

Filed Oct. 22, 1963

INVENTOR.
BRUCE A. SCHILTZ
BY
Dugger Bucklock Johnson + Westman
ATTORNEYS

United States Patent Office 3,209,932
Patented Oct. 5, 1965

3,209,932
HAYSTACK MOVING APPARATUS
Bruce A. Schiltz, 934 Scott, Shakopee, Minn.
Filed Oct. 22, 1963, Ser. No. 317,919
10 Claims. (Cl. 214—505)

The present invention has relation to a moving apparatus and more particularly to an apparatus which will move large objects, such as haystacks, and has means thereon to facilitate the loading and unloading of the object.

In recent years machines for moving complete haystacks in one operation have been advanced. Usually, the machine utilizes a large bed mounted on a truck or trailer. The bed will tilt so that the rear portions thereof contact the ground. The bed is usually comprised of a plurality of longitudinally extending support members or beams. The bed is backed against the haystack or other object that is to be moved. The bed is tilted and a large winch operated sling is placed around the rear portions of the haystack or object. The winch is then activated and the bed will be pulled back under the stack until the stack is in position on the support bed. At that time, the bed can be moved to horizontal and the stack or other object moved to its desired location.

The stack is removed from the bed by reversing the winch action.

It can readily be understood that the use of a sling and winch necessarily entails a substantial amount of labor. Also, inasmuch as winches are relatively slow operating, the loading and unloading operations do consume a considerable amount of time.

In addition, there are several drawbacks to the conventional stack mover, including the inability to load extremely large stacks. The variations and conditions of the hay in the stacks that are moved make it difficult to obtain uniform loading action with the conventional stack movers. Where the hay is very light and fluffy, the sling will sometimes be forced into the stack a considerable distance and it is difficult to remove these slings after the stack has been loaded.

In order to overcome the difficulties inherent in the construction of the present stack movers, the present device was advanced. In the present invention, as disclosed, a stack mover bed is made up of a plurality of longitudinal extending beams which are joined together by suitable cross members and mounted onto a running gear, as disclosed, a truck.

Each of the beams has an endless member or chain mounted thereon for movement in longitudinal direction thereon. The upper portion or section of the chain rides on top of the beam on which it is mounted and is driven from the forward end. Suitable drive mechanism is utilized for driving the chains.

When a stack is to be loaded, the bed comprising the elongated beams is tilted so that the rear portions thereof are adjacent the ground and the bed is moved next to the object or haystack which is to be moved. The chains on the bed can then be powered, through the drive mechanism. The upper section of the chain riding on the beams will move from the rear toward the front portion of the bed. Also, the running gear supporting the bed is then moved rearwardly so that the bed members or beams engage the stack.

The running gear, which as disclosed may be a truck, is powered rearwardly so that the speed of movement of the chains forwardly along the supporting beams and the ground speed rearwardly of the running gear is identical. The chains are mounted over sprockets which extend outwardly from the rear ends of the beams. The chains will lift up the stack as the running gear moves rearwardly and will carry the stack along while the running gear slips underneath the stack, until the stack is completely supported upon the bed.

The bed can then be tilted downwardly to its normal horizontal position and the stack or other object moved to its desired location.

If desired, a suitable ground drive wheel or member can be utilized on each of the longitudinally extending support members to drive the bed rearwardly. The ground wheel can be positioned so that it will engage the ground when the bed is tilted to receive a stack. Suitable chain drive mechanism can be used which will be operated by sprockets driven from the respective chains on each of the longitudinally extending support members. As the long chains are driven, they will in turn, drive the ground wheel and the bed rearwardly. By proper selection of the sprocket ratios, the ground drive of the auxiliary wheels can be matched exactly with the speed of movement of the chains so that the forward movement of the chain and the rearward movement of the bed are identical.

It is to be understood that the bed can be mounted onto a conventional trailer pulled by a farm tractor or truck, as shown, and any of a number of different drive mechanism can be utilized. Also, if found to be necessary, for certain conditions, suitable chains having upright lugs or flights attached thereto can be used on the longitudinally extending beams.

It is an object of the present invention to present a unique beam assembly which may form a component of the bed of a moving apparatus.

It is a further object of the present invention to present a moving apparatus which employs a plurality of longitudinally extending support beams, each having an endless flexible drive member mounted thereon which will lift an object to be moved and, at the same time, move the bed underneath the object.

In the drawings,

FIG. 1 is a side elevational view of a moving apparatus made according to the present invention showing it with the bed thereof in a tilted loading position and a haystack partially loaded onto the bed;

FIG. 2 is a side elevational view of the device of FIG. 1 after the haystack has been completely loaded onto the bed and the bed is in its horizontal traveling position;

FIG. 3 is a top plan view of the device of FIG. 2 shown with the haystack removed;

FIG. 4 is a fragmentary enlarged longitudinal sectional view of the device of FIG. 1, showing the bed in its tilted position;

FIG. 5 is a fragmentary side elevational view of a rear portion of one of the beams used to form the bed of the mover with parts broken away for the sake of clarity.

FIG. 6 is a view taken as on line 6—6 of FIG. 5;

FIG. 7 is a fragmentary enlarged sectional view taken as on line 7—7 in FIG. 3;

FIG. 8 is a top plan view of the front portions of the bed made according to the present invention illustrating an alternate form of drive mechanism;

FIG. 9 is a side elevational view of the device of FIG. 1, illustrating a further modified drive mechanism used with the device of the present invention;

FIG. 10 is a fragmentary front elevational view taken as on line 10—10 in FIG. 9; and FIG. 11 is a fragmentary sectional view of the rear portion of a beam made according to the present invention showing an optional chain tightener arrangement.

*General machine construction*

Referring to the drawings the numerals of reference thereon, the haystack or object mover illustrated generally at 15 is comprised as a platform or bed assembly 16 which is made of a plurality of longitudinally extending beam assemblies 17, joined together by cross members 18, 18. A subframe assembly 19 is utilized for mounting the bed 16 onto the frame 20 of a truck 21. The subframe is mounted to the frame 20 of the truck with brackets 22 and a pivot shaft 23 and is movable about a substantially horizontal pivotal axis.

As shown, the truck 21 has tandem drive wheels 26 mounted at the rear portions of the frame 20 and forward wheels 27 which support the front of the truck. The pivot shaft 23 is located substantially midway between the forward and rear tandem wheels 26 in longitudinal direction. The rear truck wheels are driven with a drive shaft 28 which in turn operates the drive wheels through a conventional differential 29.

It is to be specifically understood that the bed assembly 16 can be mounted onto any running gear, such as a trailer and pulled with a farm tractor. The power takeoff shaft, which is conventional on farm tractors, can also be used for operating the bed, as will be more fully explained later.

The truck has a conventional internal combustion engine for operating the forward drive of the truck and also for operating the other powered components of the mover.

The position and movement of the bed 16 about the axis of shaft 23 is controlled with a hydraulic cylinder assembly 30 which is attached to a bracket 31 mounted onto the frame 20 of the truck and which is also attached to suitable brackets 32 at the forward end of subframe 19. The cylinder assembly 30 is operated with suitable hydraulic power supplied by a pump driven by the truck motor, as is done conventionally, and can be a multi-stage cylinder, as shown, or can be a simple single or double acting cylinder, if desired.

The bed unit 16 can thus be tilted so that the front portions 35 thereof will move upwardly and the rear portions 36 move downwardly by supplying fluid under pressure through a conduit 37 to the cylinder 30. The raised or tilted position is shown in FIGS. 1 and 4.

*Beam construction*

As can perhaps best be seen in FIGS. 3, 5, 6 and 7, each of the longitudinally extending beam assemblies 17, which comprise the bed assembly 16, is made as a hollow steel beam 34 of rectangular cross-section and which is continuous for the entire length of the bed. The beams are identically constructed and the following description will deal with one of the beams only, to simplify the description. A sprocket 38 is rotatably mounted between side wall members 41 and 42 of the beam on a suitable individual shaft 39 which in turn is mounted at the rear end of each of the beams. The outer peripheral portion of the sprocket 38 protrudes outwardly beyond the rear end of the beam. A separate drive sprocket 40 is mounted between side wall members 41 and 42 of each of the beams and is drivably mounted onto a shaft 43. The shaft 43 is journalled in suitable bearings 44 at the forward end of each of the beams. The bearings 44 can be mounted onto bearing hanger assemblies 47 which have a screw 48 mounted through a bracket 49 and held in place by lock nuts 51, 51 to provide for adjustment of the sprockets 40 in forward and reverse direction. The shaft 43 will move in provided slots 50 of the side wall members 41 and 42 of each of the beams. The bearing adjustment has to be sturdy enough to support the chains and shafts. An alternate method of providing for chain tighteners is shown in FIG. 11.

As disclosed, an endless flexible conveyor member, such as a roller chain 52 is mounted over the sprockets 38 and 40 in each beam. The chain has a top longitudinally extending section 53 which rides on an upper wall 54 of the beam on which it is mounted and a lower section 55 which passes through the interior of the beam. The lower section 55 can ride on a bottom wall 56 of its beam. If desired, suitable idler sprockets can be provided to support the chain, both on the top of the beams and inside the beam.

It is to be understood that each of the beams 17 comprising the bed 16, is identically constructed. The discussion herein is directed to one beam only, for the sake of simplicity.

The chain or endless flexible conveyor member 52 can be of any suitable type and, if found to be necessary to meet existing conditions, can include a portion thereon which has upright legs or prongs 59 on the links, to aid in loading of the object to be moved.

*First form of drive mechanism*

As can be seen in FIG. 3, the shaft 43 which mounts sprockets 40 at the forward end of each of the beams is continuous across the entire width of the bed 16. The front shaft may, if necessary or desired, be made up of individual sections which are joined together by universal joints 60, which will compensate for any misalignment between the adjacent sections of the shaft. The shaft 43 is journalled at the front end of each of the beams with the bearings 44, as shown. As shown in FIG. 11, if desired, the adjustment or takeup device for the chains 52 can be provided for at sprockets 38. This will eliminate any universal joints in the shaft 43.

As shown in FIG. 11, at the rear portion of the beam, sprockets 38 are adjustably mounted to the beams. When this is done, the shaft 43 can be a continuous shaft without universal joints and bearings 44 for the shaft 43 can be mounted in any usual or preferred manner without providing for chain take-up.

Each of the sprockets 38 is rotatably mounted on a shaft 159 in a U-shaped yoke or bracket 160. The chain 52 is mounted on the sprocket 38 as previously described. The bracket 160 is in turn mounted onto a stud 161 which is threaded. The stud in turn is attached to a square shaft 162. The square shaft 162 is slidably mounted in a pair of brackets 163, 163 which are welded to the tube or beam. The brackets 163, 163 are spaced apart and the holes for slidably mounting the square shaft closely fit the shaft. The stud is passed through an opening 164 in a plate 164 which is welded to the end of the beam. The chain is tightened by adjusting a pair of nuts 166, 166 which are threaded onto stud 161 and bear against plate 165 through a large washer. The amount of tension in the chain 52 can thus be easily adjusted.

The square shaft holds the sprocket square and so that it operates efficiently. All of the sliding parts are shielded from the hay, as these parts are within the tube or beam.

The truck 21, as stated previously has a suitable power unit, which will drive the conventional power takeoff shaft 61 of the truck. A transmission 62, which has a suitable range of gears, as well as a reverse gear is mounted onto a bracket 63 which in turn is mounted to the frame 20 of the truck. An input shaft 64 of the transmission is driven from the power takeoff shaft 61 through a suitable chain and sprocket 65, or other conventional drive means. An output shaft 68 of the transmission 62 is connected to a conventional telescoping drive shaft 69. The drive shaft 69 is comprised as an inner shaft 70 slidably drivably mounted into an outer tube 71 and having a pair of universal joints 72, 72 at opposite ends thereof. A first of the universal joints is drivably connected to output shaft 68 of the transmission.

A second of the universal joints 72 is drivably connected to an input shaft 73 of a right angle drive gear box 74. The right angle gear box 74 has a double ended output shaft 75. The gear box 74 has suitable gear reduction. A pair of sprockets 78, 78 are drivably mounted onto outwardly extending ends of output shaft 75 of the gear box 74. A pair of drive chains 79, 79 are drivably mounted over sprockets 78, 78 and extend upwardly to driven sprockets 80, 80 which in turn are drivably mounted onto shaft 43, which drives the forward sprockets 40 for the chains 52. The sprockets 80, 80 are positioned midway between pairs of beam assemblies 17.

Thus, when the shaft 61 is driven and transmission 62 is in a suitable drive gear, the sprockets 78 will be driven, which in turn will drive sprockets 80 and thus shaft 43 to rotate sprockets 40 and move the chain 52 in suitable direction, depending on whether the object being loaded is moved onto the platform or is being moved off the platform.

Further, by using transmission 62, the speed of the chains 52 can be adjusted to coincide with the rearward speed of the truck, which can be set through conventional gearing and drive wheels 26. This will be more fully explained later in connection with the operation of the mechanism.

*Ground drive mechanism for bed*

In certain instances, such as when the bed is mounted onto a trailer, rather than a truck, it is necessary to have auxiliary ground drive mechanism to synchronize the rearward speed of the bed with the linear speed of the chains as they move forwardly along the beams. Also, when certain other drive mechanism, which will be explained later, is utilized, a transmission, such as that shown in 52 is not used, and rather than power the running gear, such as a truck, rearwardly, auxiliary ground drive mechanism is utilized.

As best shown in FIGS. 5 and 6 each of the ground drive assemblies 77 includes a pair of adjustable offset straps 81, 81 which are mounted to each of the beams 34 with a suitable bolt or other mechanism 82. The lower ends of the straps 81, 81 support a ground engaging member or wheel 83 which is mounted onto a shaft 84 passing through the provided openings in the straps 81, 81. The shaft is rotatably mounted onto the straps 81. The wheel 83 is drivably mounted onto the shaft.

A pair of auxiliary braces 85, 85 are mounted on shaft 84 and also straddle the wheel 83. The upper portions of the braces 85, 85 are attached to the sidewalls 41 and 42 of the beam 34, on which they are mounted, with a shaft 86.

A sprocket 90 is drivably mounted onto the shaft 86 and is positioned within the beam member 34 midway between the sidewalls 41 and 42. The sprocket 90 is positioned to engage the lower section 55 of chain 52, as shown in FIG. 5 and to be driven by the chain as the chain moves.

A pair of idler sprockets 91, 91 are rotatably mounted onto shafts 92, 92 which in turn are mounted between the sidewalls 41 and 42, of their respective beams. The idler sprockets 91, 91 are positioned to increase the chain wrap around sprocket 90 so that a positive drive is effected at all times.

The sprocket 90 drives shaft 86 whenever the chain 52 is being driven. The shaft 86 has a sprocket 93 mounted on an outer end thereof and a chain 94 extends from sprocket 93 to a sprocket 95 which in turn is drivably mounted onto shaft 84. The shaft 84 drives wheel or ground engaging member 83 at a predetermined, preset ratio to chain movement.

The sprockets 90, 93 and 95 are chosen in relation to the effective driving diameter wheel 83 so that when the chains 52 are driven, which in turn will drive their sprockets 90 and through the drive train, wheels 83, the wheels 83 will drive the bed assembly 16 through brackets 81 and 85 in rearward direction as indicated by arrow 96 at a speed which is equal to the linear speed of the chain 52 as it moves in direction as indicated by arrow 97. Thus, any object being lifted and moved will remain substantially stationary with respect to linear movement over the ground and the bed 16 will be moved underneath the object, until the object is removed from the ground.

An access hole 98 is provided for installing the sprockets inside the tube.

It is obvious that the wheel 83 could be replaced with any suitable ground engaging member, such as a crawler track unit, if desired. As shown, a pneumatic tire is utilized, but if traction becomes a problem, other units can be substituted.

There is one ground drive assembly 77, mounted on each of the beams, as shown.

*Hydraulic motor chain drive*

Referring specifically to FIG. 8, it can be seen that the beams 34 carrying the chains 52 are constructed as in the other forms of the invention. The chains 52, however, can be driven by a modified drive, as will be described.

In this form of drive, bearing hangers 104 are mounted onto each of the beams 34. Each of the bearing hangers has an adjustment means 105, as previously described. The bearing hangers 104 hold individual shafts 106. The shafts 106 of each of the beam assemblies 17 are connected with a separate telescoping drive shaft assembly. Each of the telescoping drive shaft assembly 107 comprises an inner drive member 108 slidable mounted into an outer tube 109 and having a pair of universal joints 110, 110 at opposite ends thereof. The universal joints 110 are connected to the shafts 106.

The shaft 106 mounted in a centrally located beam 113 is also rotatably mounted in a separate bearing 114 which is mounted onto a bracket 115. The bracket 115 supports a hydraulic motor 116. The hydraulic motor receives fluid under pressure through conduits 117, 117 and these conduits are connected to a suitable double acting reversing valve 118, which is shown schematically. The valve 118 will direct fluid under pressure from a pump 119 to the motor. The valve and pump are also connected to a reservoir 120. The pump and reservoir, as well as the valve assembly 118 are mounted either on a truck or farm tractor which will be used for moving the bed 16.

The hydraulic motor 116 utilizes the fluid under pressure from pump 119 to drive an output shaft 123. The output shaft 123 has a sprocket drivably mounted thereon. The sprocket is drivably connected through a chain 124 to a sprocket 125 which is mounted on the shaft 106 adjacent bearing 114.

The hydraulic motor 116 is driven by fluid under pressure and in turn will drive the shafts 106 through the telescoping drive shaft assemblies 107. These shafts in turn will rotate the forward sprockets 40 and drive chains 52, as previousbly described. The rest of the mechanism for the bed 16 of the mover is the same as previously described.

Also, in this form of the drive the tightener means for the chains 52 can be attached to the rear sprocket 38. In that case, a straight through front shaft can be used, in place of the shaft section 106. The telescoping drive shafts 107 would then become unnecessary.

*Third form of drive for chains*

Referring to FIGS. 9 and 10, a third form of a drive which may be utilized for driving the chains 52 on the beams is shown. In this form of the drive, the shaft for the forward sprockets 40 in each of the beams 17 can be substantially the same as shaft 43. The shaft can be continuous across the entire width of the machine, if desired, and the takeup for chain 52 can be incorporated in the idler sprockets at the rear of the beam.

As shown, the bed 16 is again comprised of beam assemblies 17 which are longitudinally extending and transversely spaced. The power takeoff shaft 61 of the truck is connected through the chains 65 to an input shaft 64 of a transmission 62, as described previously. The transmission 62 is mounted on bracket 63. The output shaft 126 of the transmission, however, is differently placed in this form of the drive and its axis is at right angles to the input shaft 64.

The output shaft 126 has a sprocket 127 drivably mounted thereon. A chain 128 is drivably mounted over the sprocket 127 and extends over a driven sprocket 129 which in turn is drivably mounted onto a jack shaft 130 rotatably mounted on the frame 20 of the truck or running gear. A second sprocket 133 is mounted onto jack shaft 130 and drives a chain 134 which in turn drives a sprocket 135 which is drivably mounted onto a pivot shaft 136. The pivot shaft 136 is rotatably mounted in suitable bearings supported at second ends of a first arm assembly 137. The arm 137, is also rotatably mounted to jack shaft 130 at a first end thereof through a bearing assembly 138. A pair of pivot shaft sprockets 139, 139 are drivably mounted onto opposite ends of shaft 136. The sprockets have chains 140, 140 mounted thereon and the chains extend forwardly to sprockets 141, 141 which are drivably mounted onto shaft 142, which corresponds to shaft 43 in the first form of the invention.

The shaft 143 drives sprockets 40 and thus chains 52. The pivot shaft 136 is held in relationship to shaft 143 with a second arm 145 which is rotatably mounted through a suitable bearing assembly at a first end thereof to the shaft 143 and also mounted with a suitable bearing assembly 147 at a second end thereof to the pivot shaft 136.

Thus, it can be seen, that when the bed 16 is tilted through the use of cylinder 30, as shown in FIG. 9, the pivot shaft 136 will be raised upwardly, as shown, without changing the length of the chains 134 and 140 which drive the shaft 143. Likewise, when the cylinder 30 is retracted to lower the bed to its horizontal position, the arms 145 and 137 will permit the pivot shaft to move downwardly so that it is substantially aligned with shaft 130. The chains 140 and 134 will not change length when the pivot shaft moves to this position. Thus, the chains will remain in driving engagement with their sprockets and a drive is accomplished in this manner, without the use of telescoping drive shafts. The scissor action of arms 137 and 145 permit this to occur.

*Operation*

When the moving apparatus made according to the present invention is to be used to move a load, for example, a haystack 150, the truck with its mounted bed 16, is backed to position so that the rear ends of the beam assemblies 17 are immediately adjacent the stack 150. The bed is then tilted to position substantially like that shown in FIG. 1 so that the rear ends portions 151 of the beams clear the ground slightly. The bed is held in this position.

When the ground engaging units 77 are utilized, the position of wheel 83 can be adjusted through a suitable adjustment hole 153 on brackets 81 so that the tilting of the bed is limited to the desired level. The end of the beams will just clear the ground.

Assuming that the ground drive wheel 83 is used, the forward shaft 43 (or 143) which mounts sprockets 40 that drive the chain 52 is first driven as described. With the chain drives shown, the speed at which the chains 52 move can be controlled through the transmission 62. The truck power takeoff 61 is engaged and the chains 52 are thus driven. The ground engaging member or wheel 83, if the truck drive is left in neutral, will be driven by sprockets 90 and connected chains and in turn will drive the bed 16 and the running gear of the truck rearwardly in direction as shown by arrows 96, at the same time that the chains 52 are moving forwardly in direction as indicated by arrow 97. The rear end 151 of the beams will engage the edge of the stack and the chains coming around the idler sprockets 38 will lift the stack as they move inwardly under the driving of the ground engaging members 83.

When using the ground engaging assemblies, the traction afforded the wheels 83 can be increased by tilting the bed upwardly with cylinder 30 until the rear wheels of the truck are off the ground. The weight of the rear portion of the truck (or trailer) is supported on the wheels 83.

The speed of the chains 52 in forward direction and the speed of the bed in rearward direction is synchronized so that they are identical. Thus the chains lift the stack up and the bed actually is moved in under the stack.

When the stack has progressed sufficiently far onto the bed, the cylinder 30 is lowered and the bed will assume its horizontal position as shown in FIG. 2, with the stack in place on the bed. The bed 16 can then be moved with the truck or other running gear, for example, a trailer pulled by a farm tractor, to its desired location.

The bed is again tilted and the chains 52 are driven in a reverse direction by operation of the transmission 62, which includes a reversing gear, or by reversing the hydraulic motor, if this type of drive is utilized. A load, such as haystack 150 is then moved off by the chains. The ground engaging members can serve the same function in unloading the load as during the loading operation. By leaving the truck in neutral, the ground engaging member will move the bed out from under the stack as the stack is moved down the beams by the chains.

In normal operating conditions, the upright ears or prongs 59 are not necessary. However, in some conditions, these can be added to increase the lifting action of the chains as it is burrowing under the stack to load it.

If the ground engaging member 83 and its associated drive parts are not utilized, the bed can be driven rearwardly by powering the drive wheels 26 of the truck. By suitably selecting the gears in transmission 62, the speed of the chains and the rearward speed of the bed and truck can be synchronized also. It should be noted that the engine of the truck drives both the wheels 26 of the truck and the chains 52. Therefore, there is a positive drive relationship between the ground drive and the speed of the chains, as there is when the ground engaging members 83 is used.

It will also be evident that any of the various forms of the drive can be used with the same results. If the hydraulic motor 116 is utilized, the ground engaging member 83 should be used in order to synchronize the speed of the chains and the rearward ground speed of the bed. The hydraulic motor 116 and its associated drive parts will find use where the bed is mounted onto a trailer type running gear pulled by a farm tractor having a hydraulic system.

What is claimed is:

1. A mover apparatus comprising a bed, said bed having a plurality of longitudinally extending, substantially parallel, spaced beams, a running gear mounting said bed for movement along the ground, said bed being pivotally mounted to said running gear about a substantially horizontal axis, means for tilting said bed about said pivot from a first normal horizontal position to a second position with the rear portions thereof adjacent the ground, a plurality of separate endless flexible conveyor members extending in longitudinal direction and each mounted for movement on one beam, said conveyor members each having an upper portion positioned above the top surface of the beam on which it is mounted, a portion of the conveyor members extending rearwardly beyond the ends of their respective beams, power means for driving said conveyor members, and ground drive means for said running gear mounted at the end of the conveyor bed and adapted to engage the ground when the bed is tilted, said ground drive means and said power means being positively driven from a common power source so that when said conveyor members are powered to move the upper sections thereof forwardly along said beam, said ground drive means will move said running gear and said bed rearwardly at linear speed substantially identical to the speed of movement of said conveyor members.

2. In a moving apparatus having a running gear, a tiltable bed comprised of a plurality of longitudinally extending beams, and hydraulic means to tilt said bed about a substantially horizontal axis from a substantially horizontal position to position with the rear portions thereof adjacent the ground, the improvement comprising a separate conveyor member mounted on each of said beams, first power means to move said conveyor members forwardly along said beams, ground drive means for said running gear mounted at the rear of said bed and adapted to engage the ground when the bed is tilted, and second power means operable to drive said running gear rearwardly at substantially the same rate of speed as the conveyor means move forwardly.

3. The combination as specified in claim 2 and means to reverse direction of movement of the conveyor members and of the ground drive mechanism.

4. A moving apparatus comprising a bed, a running gear for supporting said bed for movement along the ground, means to tilt said bed so that rear portions thereof are adjacent to the ground, conveyor means mounted on said bed and movable in forwardly direction on the top of said bed, said conveyor means being engageable with an object to be moved positioned to the rear of said bed, power means to drive said conveyor, and ground drive means to synchronize the speed of said conveyor with the speed of movement of the bed comprising a member mounted on said bed adapted to engage the ground when the bed is tilted, and drive means between the conveyor and the ground engaging member.

5. A moving apparatus comprising a bed having a plurality of longitudinally extending transversely spaced hollow beams, a running gear for supporting said bed for movement along the ground, means to tilt said bed so the rear portions thereof are adjacent to the ground, conveyor means comprising a plurality of endless lengths of roller chain mounted on sprockets on opposite ends of said bed, each of said roller chains being mounted for movement on one of said beams, said chains each having a upper section positioned above the top surface of its beam and a lower section extending longitudinally through the center of its beam, said conveyor means being engageable with an object to be moved to lift it upwardly onto said bed, means to drive the upper sections of said chains forwardly, and means to drive said running gear rearwardly at the same time as the chains are moving forwardly and at substantially the same linear speed, including a separate ground engaging wheel associated with each of said beams, bracket means for mounting each of said wheels to its respective beam, a separate wheel sprocket drivably associated with each of said wheels, a separate jack shaft mounted through each of said beams, a separate sprocket drivably mounted on each of said jack shafts and in position to engage the lower section of its associated chain, a separate third sprocket mounted to the outer end of each of said jack shafts and alined with the sprockets drivably engaged with said wheel, and chain means extending between said third sprocket and said wheel sprockets.

6. A mover apparatus comprising a bed, said bed having a plurality of longitudinally extending, substantially parallel, spaced beams, a running gear mounting said bed for movement along the ground, said bed being tiltable about a transverse axis with respect to the ground, means for tilting said bed from a normal traveling position to position with the rear portions thereof adjacent to the ground, a plurality of endless chains, each of said chains being mounted on one of said beams and extending in longitudinal direction on the beams, each of said chains having upper and lower portions, the upper portions of each chain being positioned above the top surface of the beam on which it is mounted, a portion of each chain extending outwardly beyond the end of the beam on which it is mounted, power means for driving said chains, drive means for said running gear mounted at the rear of said bed and adapted to engage the ground when the bed is tilted, means to synchronize said drive means and said power means so that when said chains are powered to move the upper portions thereof forwardly along said beam the drive means will move said running gear and said bed rearwardly at linear speed substantially identical to the speed of movement of said chains, said drive means including a plurality of wheel members mounted adjacent to the rear of said bed, said wheel members being positioned to maintain the outer ends of said beams slightly spaced from the ground.

7. A mover apparatus comprising a bed, said bed having a plurality of longitudinally extending, substantially parallel, spaced beams, a running gear mounting said bed for movement along the ground, said bed being pivotally mounted to said running gear, means for tilting said bed about said pivot from a normal position to position to the rear portions thereof adjacent to the ground, a separate sprocket mounted on opposite ends of each of said beams, an endless chain mounted to said sprockets on each of said beams and extending in longitudinal direction along said beams, said chains having upper and lower portions, the upper portions of each chain being positioned above the top surface of the beam on which it is mounted, a portion of the rear sprockets of said beams extending outwardly beyond the ends of said beams, power means for driving said chains, ground drive means for said running gear comprising a member mounted on each of said beams and adapted to engage the ground when the beams are tilted, and means associated with the lower portion of said chains to drive the respective ground engaging members on the beams so that when said chains are powered to move the upper sections thereof forwardly along the beams the ground drive means will move said running gear and said bed rearwardly at linear speed substantially identical to the speed of movement of said chains.

8. The combination as specified in claim 7 wherein said ground engaging members are comprised as wheels, bracket means for mounting each of said wheels to its respective beams, a separate wheel sprocket drivably associated with each of said wheels, a separate jack shaft rotatably mounted to each of said beams, a separate sprocket drivably mounted on each of said jack shafts and in position to engage the lower section of its associated chain, a separate third sprocket mounted on the outer end of each of said jack shafts and aligning with the sprockets drivably engaged with said wheels and chain means extending between said third sprockets and said wheel sprockets.

9. The combination as specified in claim 8 wherein said means to tilt said bed includes hydraulic cylinder means of sufficient power to force said bed into position wherein a substantial portion of the weight of the rear portions of said running gear and said bed is carried on said ground engaging members.

10. A mover apparatus comprising a bed, said bed having a plurality of longitudinally extending substantially parallel, spaced tubular beams having rectangular cross section, a running gear mounting said bed for movement along the ground, said bed being pivotally mounted to said running gear about a substantially horizontal axis, means for tilting said bed about said axis from a normal substantially horizontal position to position with the rear portions thereof adjacent the ground, a separate sprocket mounted on opposite ends of each of said beams, an endless chain mounted over the sprockets on each beam and extending in longitudinal direction along the beam, each chain having an upper portion and a lower portion, the upper portion of said chains being positioned above the top surface of the beam on which it is mounted and the lower portion thereof extending through the beam, a portion of the rear sprockets of said beams extending outwardly beyond the ends of said beams, common shaft means connecting each sprocket at the forward ends of said beams so that each rotates with the other sprockets, power means for driving said shaft means including a gear box driven from a prime mover and first drive means comprising a jack shaft rotatably mounted with respect to said prime mover, second drive means extending from said gear box to said jack shaft, a first arm rotatably mounted at a first end thereof to said jack shaft, a pivot shaft rotatably mounted to a second end of said first arm, third drive means extending from said jack shaft to said pivot shaft, a second arm rotatably mounted at a first end thereof to said pivot shaft and rotatably mounted at a second end thereof to said common shaft means, fourth drive means extending from said pivot shaft to said common shaft, and ground drive means for moving said running gear, said ground drive means being driven in positive relationship with respect to said power means so that when said chains are powered to move the upper sections thereof forwardly along said beam, said ground drive means will move said running gear and said bed rearwardly at linear speed substantially identical to the speed movement of said chain.

References Cited by the Examiner

UNITED STATES PATENTS

| | | | |
|---|---|---|---|
| 2,099,684 | 11/37 | Fitch | 214—516 X |
| 2,156,438 | 5/39 | Suverkrup | 214—508 X |
| 2,317,984 | 5/43 | Fitch | 214—516 |
| 2,318,229 | 5/43 | Jones | 56—350 X |
| 2,408,862 | 10/46 | Lisota | 214—83.36 X |
| 2,468,055 | 4/49 | Gibler | 214—353 X |
| 2,526,960 | 10/50 | McElhinney et al. | 56—364 |
| 3,025,982 | 3/62 | Quint | 214—83.36 |

FOREIGN PATENTS 525,903   2/54   Belgium.

HUGO O. SCHULZ, *Primary Examiner*.

GERALD M. FORLENZA, *Examiner*.